(12) United States Patent
Campbell et al.

(10) Patent No.: US 11,396,573 B2
(45) Date of Patent: Jul. 26, 2022

(54) HYDROPHOBIC BLOCK—RANDOM BLOCK COPOLYMER EMULSION POLYMER STABILIZERS

(71) Applicant: BASF SE, Ludwigshafen (DE)

(72) Inventors: John David Campbell, Grosse Ile, MI (US); Sean Raymond George, Southgate, MI (US); Gary A. Deeter, Livonia, MI (US); Bernd Reck, Gruenstadt (DE); Michael Cunningham, Kingston (CA); Connor Sanders, Peterborough (CA)

(73) Assignee: BASF SE

( * ) Notice: Subject to any disclaimer, the term of this patent is extended or adjusted under 35 U.S.C. 154(b) by 0 days.

(21) Appl. No.: 16/767,321

(22) PCT Filed: Nov. 28, 2018

(86) PCT No.: PCT/US2018/062788
§ 371 (c)(1),
(2) Date: May 27, 2020

(87) PCT Pub. No.: WO2019/108608
PCT Pub. Date: Jun. 6, 2019

(65) Prior Publication Data
US 2020/0392274 A1    Dec. 17, 2020

Related U.S. Application Data

(60) Provisional application No. 62/591,518, filed on Nov. 28, 2017.

(51) Int. Cl.
*C08F 293/00* (2006.01)
*C08F 212/08* (2006.01)
*C08F 287/00* (2006.01)

(52) U.S. Cl.
CPC ........ *C08F 293/005* (2013.01); *C08F 212/08* (2013.01); *C08F 287/00* (2013.01); *C08F 2438/02* (2013.01)

(58) Field of Classification Search
CPC .. C08F 293/005; C08F 212/08; C08F 287/00; C08F 2438/02
See application file for complete search history.

(56) References Cited

U.S. PATENT DOCUMENTS

| | | | | |
|---|---|---|---|---|
| 5,434,030 A | * | 7/1995 | Smith | G03G 9/08791 430/108.21 |
| 2002/0013430 A1 | * | 1/2002 | Klaerner | G01N 33/54353 526/75 |

(Continued)

FOREIGN PATENT DOCUMENTS

| | | |
|---|---|---|
| EP | 3 081 580 A1 | 10/2016 |
| JP | 2006-348128 A | 12/2006 |
| WO | WO 02/090392 A1 | 11/2002 |

OTHER PUBLICATIONS

International Search Report dated Feb. 26, 2019 in PCT/US2018/062788, citing documents AO through AQ and AX therein, 4 pages.

(Continued)

*Primary Examiner* — Mark S Kaucher
(74) *Attorney, Agent, or Firm* — Faegre Drinker Biddle & Reath LLP

(57) ABSTRACT

A copolymer includes a hydrophobic head segment and a random copolymer tail segment comprising hydrophobic blocks and ionizable blocks. Emulsion polymerization systems incorporate the copolymer as a surfactant.

35 Claims, 3 Drawing Sheets

Anchor Block ("tail")    Stabilizing Block ("head")

(56) References Cited

U.S. PATENT DOCUMENTS

| | | | | |
|---|---|---|---|---|
| 2002/0061988 A1* | 5/2002 | Klaerner | ............... | C08F 4/00 |
| | | | | 526/193 |
| 2002/0198316 A1* | 12/2002 | Adam | ............... | C08F 2/38 |
| | | | | 524/832 |
| 2004/0209995 A1 | 10/2004 | Adam et al. | | |
| 2010/0270020 A1* | 10/2010 | Baran, Jr. | ............... | C09K 8/604 |
| | | | | 166/305.1 |
| 2011/0207841 A1* | 8/2011 | Kosar | ............... | C08L 53/00 |
| | | | | 521/134 |
| 2016/0251524 A1* | 9/2016 | Kohyama | ............... | C09D 5/00 |
| | | | | 524/533 |

OTHER PUBLICATIONS

George, S.R., "Amphiphilic Diblock Copolymers as Stabilizers in Emulsion Polymerization", PhD Thesis, Queen's University, Kingston, Ontario, Canada, May 4, 2017, 255 pages.

\* cited by examiner

Anchor Block ("tail")   Stabilizing Block ("head")

HYDROPHOBIC BLOCK—RANDOM BLOCK COPOLYMER EMULSION POLYMER STABILIZERS

CROSS-REFERENCE TO RELATED APPLICATIONS

This application claims the benefit of priority to U.S. Provisional Patent Application No. 62/591,518, filed on Nov. 28, 2017, the disclosures of which are incorporated herein by reference in their entirety.

FIELD

In general, the present technology relates to the field of water-based polymer dispersions. More specifically, the present technology relates to the emulsion polymer stabilizer having a hydrophobic block and a random copolymer block.

BACKGROUND

The most common stabilizers in emulsion polymerizations are small molecule surfactants. They are well understood, inexpensive, and provide stability to the emulsions and resulting latexes. However, small molecule surfactants can have negative impacts on the final products. For example, charged, small molecule surfactants are generally required, however can be easily extracted or leeched from a cured film and result in negative changes to the film performance such as water sensitivity. In addition, small molecule surfactants are undesirable in applications such as food contact.

Therefore, the industry has sought a polymeric stabilizer for emulsion polymerization that exhibits lower water sensitivity to reduce the inherent issues with low MW surfactants. A number of approaches are known to address this problem, including the use of protective colloids. Commonly these are low molecular weight resins with acid functionality for example styrene/acrylic or acrylic copolymers. The disadvantage of these systems is that a large amount of stabilizer is normally required, thereby limiting the water resistance properties. Further refinements have been block copolymers with distinct hydrophobic blocks and hydrophilic blocks. However, these systems have typically been limited to relatively low solids content of the emulsions, limiting their usefulness for industrial applications. Therefore, the industry requires polymeric stabilizers that enable high solids at the low stabilizer loading that is needed for resistance properties.

SUMMARY

In one aspect, a method of emulsion polymerization is provided, the method including providing water and a water dispersible block copolymer to form an emulsion polymerization stabilizing system; and adding monomers to the emulsion polymerization system. The block copolymer has a hydrophobic block ("Block A") and a random amphiphilic block ("Block B"), where Block B includes hydrophobic repeat units and ionizable repeat units; and the method uses less than 1 wt. % of a small molecule surfactant. In some embodiments, the method uses less than 0.5 wt. % of a small molecule surfactant. In other embodiment, the method is entirely free of the use of a small molecule surfactant. As used herein, the small molecule surfactants are those surfactants that have a molecular weight of about 3000 g/mol or less.

According to various embodiments, the monomers used in the methods include styrenic monomers, methacrylate monomers, acrylate monomers, (vinyl) acetate monomers, or a mixture of any two or more thereof.

In the block co-polymer, Block A may include styrenic, acrylate, or methacrylate repeat units. In any of the embodiments herein, Block A may include a homopolymer based upon styrenic repeat units. In any of the embodiments herein, Block A may be a copolymer block with two or more of styrenic, acrylate, or methacrylate repeat units. In any of the embodiments herein, the styrenic repeat units may be styrene, α-methyl styrene, or a copolymer thereof. In Block B, the hydrophobic repeat units may include styrene, α-methyl styrene, an acrylate, a methacrylate, or a copolymer of any two or more thereof. In some embodiments, the hydrophobic repeat units may include styrenic repeat units. In any of the embodiments herein, Block B includes ionizable repeat units that may include a carboxylic acid. In some embodiments, the ionizable repeat units include methacrylic acid, acrylic acid, vinyl benzoic acid, vinyl acetic acid, maleic anhydride, maleic acid, maleate, fumarate, crotonic acid, itaconic acid, fumaric acid, citraconic anhydride, mono 2-(methacryloyloxy)ethyl phthalate, mono 2-(methacryloyloxy)ethyl succinate, mono 2-(acryloyloxy)ethyl succinate, salts thereof, or a combination of any two or more thereof.

In some embodiments, the Block A and/or Block B hydrophobic repeat units comprise styrene, α-methyl styrene, ethyl acrylate, n-propyl acrylate, isopropyl acrylate, n-butyl acrylate, n-butyl acrylate, iso-butyl acrylate, t-butyl acrylate, n-amyl acrylate, iso-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, sec-butyl-methacrylate, tert-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, or a combination of any two or more thereof.

In some embodiments, Block B includes acrylic acid, and the mole percentage of acrylic acid units in Block B ($f_{AA}$) is from about 10% to about 90%; and overall mole percentage of acrylic acid units in the block copolymer ($F_{AA}$) is from about 5% to about 80%.

In some embodiments, Block B includes acrylic acid, and the mole percentage of acrylic acid units in Block B ($f_{AA}$) is from about 21% to about 52%; and overall mole percentage of acrylic acid units in the block copolymer ($F_{AA}$) is from about 14% to about 26%.

In any of the above embodiments, the block copolymer may have a number average molecular weight from about 5,000 to about 30,000 g/mol. In any of the above embodiments, the block copolymer may have a number average molecular weight from about 5,000 to about 25,000 g/mol. In any of the above embodiments, the block copolymer may have a number average molecular weight from about 10,000 to about 20,000 g/mol.

In any of the above embodiments, Block A may be a polymer block of polystyrene, poly-α-methyl styrene, an acrylate, a methacrylate, or a copolymer of any two or more thereof; and Block B may be a random copolymer of a first monomer selected from the group consisting of styrene, α-methyl styrene, an acrylate, a methacrylate, or a mixture of any two or more thereof; and a second monomer having an ionizable group selected from the group consisting of a carboxylic acid. In some embodiments, the block copolymer may include polystyrene-b-(poly(styrene-r-acrylic acid)), poly-α-methylstyrene-b-(poly(styrene-r-acrylic acid)), poly (butyl acrylate)-b-poly(styrene-r-acrylic acid), poly(butyl acrylate)-b-poly(butyl acrylate-r-acrylic acid), or polystyrene-b-poly(butyl acrylate-r-acrylic acid).

In the method, from greater than 5% to about 100% of the ionizable groups may be neutralized, or from about 20% to about 100% of the ionizable groups may be neutralized. The block copolymer may be present in the emulsion polymerization system from about 1 wt. % to about 30 wt. %.

In another aspect, a polymer-stabilized emulsion polymerization system is provided, that includes water; and a block copolymer including a hydrophobic block ("Block A"); and a random amphiphilic block ("Block B") comprising a random distribution of hydrophobic repeat units and ionizable repeat units. The block copolymer may be any of those as described herein.

DETAILED DESCRIPTION

Figure 1:
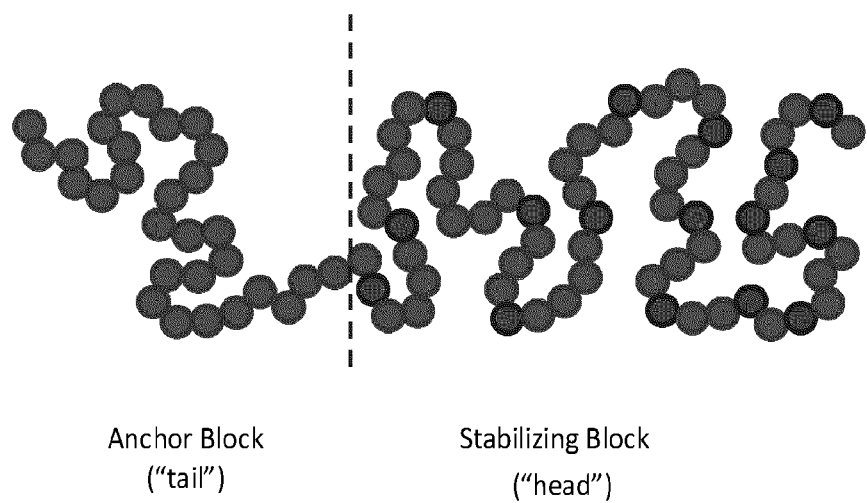
FIG. 1 is an illustration of a block-random-copolymer as disclosed herein.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% or up to plus or minus 5% of the stated value.

As used herein, "functional groups" includes, but is not limited to, halides, alcohols, ethers, carbonyls (including aldehydes, ketones, and carboxyl groups), amines, amides, cyanos, ureas, thiols, and combinations of two or more thereof. In some embodiments, the functional groups may include one or more carboxyl, hydroxyl, amino, uredo, acetoacetoxy, or diacetone group, or mixtures of two or more thereof.

As will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

In general, as used herein, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, tert-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

As used herein, "aryl," or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. An aryl group with one or more alkyl groups may also be referred to as alkaryl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Heterocyclyl or heterocycle refers to both aromatic and nonaromatic ring compounds including monocyclic, bicyclic, and polycyclic ring compounds containing 3 or more ring members of which one or more is a heteroatom such as, but not limited to, N, O, and S. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 oxygen atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more 0 atoms, pyrrolyl, pyridinyl homopiperazinyl, oxazolidin-2-onyl, pyrrolidin-2-onyl, oxazolyl, quinuclidinyl, thiazolyl, isoxazolyl, furanyl, dibenzylfuranyl, and tetrahydrofuranyl. Heterocyclyl or heterocycles may be substituted.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, dibenzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 16 carbon atoms, 7 to 14 carbon atoms, or 7 to 10 carbon atoms. Aralkyl groups may be substituted or unsubstituted. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanyl ethyl. Representative substituted aralkyl groups may be substituted one or more times with substituents such as those listed above.

The term "carboxyl" or "carboxylate" as used herein refers to a —C(O)OH group or to its ionized form, —C(O) O$^-$.

The term "ester" as used herein refers to —C(O)OR$^{60}$ groups. R$^{60}$ is a substituted or unsubstituted alkyl, cycloalkyl, alkenyl, alkynyl, aryl, aralkyl, heterocyclylalkyl or heterocyclyl group as defined herein.

The term "amine" (or "amino") as used herein refers to —NR$^{65}$R$^{66}$R$^{67}$ groups, where the R$^{67}$ group may or may not be present, but when present the amino group is a cationic group. In the formula, R$^{65}$ and R$^{66}$, and R$^{67}$ when present, are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, trialkylamino arylamino, or alkylarylamino.

As used herein, the term "partially neutralized" is intended to refer to neutralization of about 5 mol % or more, up to an including about 95%, of the acid groups on the acid-functional resin. However, in some embodiments, partial neutralization refers to neutralization of from about 20 mol % to about 95 mol % of the acid groups. This may include in various embodiments at least about 5 mol % of the acid groups, at least about 10 mol % of the acid groups, from about 10 mol % to about 95 mol % of the acid groups, from about 8 mol % to about 85 mol % of the acid groups, or from about 15 mol % to about 50 mol % of the acid groups. In some embodiments, about 30 mol % of the acid groups on the acid-functional resin may be neutralized.

It has been found that water dispersible block random copolymers ("BRCs") consisting of one "anchoring" hydrophobic block ("Block A") and one "stabilizing" block ("Block B") that is a random copolymer of at least one neutralizable group and at least one hydrophobic group are able to stabilize emulsion polymerization at low levels, and enable high solids (>40 wt % solid content) emulsions without destabilization, and without the use of, or with only minimal amounts of, small molecule surfactants. Since non-neutralized acid groups are significantly more hydrophobic than the neutralized acid group, the hydrophobic group of the stabilizing block could be a non-neutralized acid. The anchoring block anchors to a polymerizing emulsion particle, while the stabilizing block provides the acid groups for stabilization of the particle. The high solids content may be from about 40 wt % to about 90 wt %. The high solids content is based upon the total weight of all components in the system.

FIG. 1 is an illustration of an BRC as disclosed herein. In FIG. 1, the anchoring block, or "tail," is shown as being attached to a stabilizing block, or "head," where the stabilizing block is a random copolymer of hydrophilic and ionizable repeat units in the block. The design of the BRCs is similar to that of a gradient copolymer, except the BRCs have distinct block compositions, rather than a composition that varies continuously over the entire chain.

When applied in an emulsion polymerization, water dispersible BRCs are bound to a latex particle (i.e. the particle being polymerized in the emulsion) by the anchoring block. Without being bound by theory, it is believed that the stabilizing random copolymer block may lay along the surface of the emulsion particle, resulting in a reduced hydrodynamic radius. As a result, the solids content can be increased while maintaining kinetic stability, and reducing the mobility of the stabilizers in the final product.

In one aspect, a polymer-stabilized emulsion polymerization system (or "polymer dispersion system") is provided. The polymerization systems include water and a water dispersible BRC, where the BRC includes a hydrophobic block ("Block A") and a random amphiphilic block ("Block B"). Block B includes a random distribution of hydrophobic repeat units and ionizable repeat units. According to various embodiments described herein, the BRC may have a number average molecular weight from about 5,000 to about 30,000 g/mol. The emulsion polymerization systems are also essentially free of small molecule surfactants, which may be defined in some instances as surfactants having a molecular weight of up to about 3000 g/mol (i.e. about 3000 g/mol or less).

As noted above, Block A of the BRC is a hydrophobic block. Accordingly, the repeat units that make up Block A are hydrophobic. Illustrative hydrophobic repeat units include, but are not limited to, styrenic, acrylate, or methacrylate repeat units, or a mixture of any two or more thereof. Block A may be a homopolymeric block or a copolymeric block. In some embodiments, the hydrophobic block includes styrenic repeat units. Illustrative styrenic repeat units include, but are not limited to, those derived from styrene, α-methylstyrene, derivatives of styrene or α-methylstyrene, or a mixture of any two or more thereof. Thus, in some embodiments, Block A may be a homopolymer block based upon styrenic repeat units. In other embodiments, Block A may be a copolymer block that includes two or more of styrenic, acrylate, or methacrylate repeat units. In some embodiments where Block A is copolymer block, one of the repeat units is a styrenic repeat unit. Where Block A includes an acrylate or methacrylate as a repeat unit, illustrative such materials include, but are not limited to, ethyl acrylate, n-propyl acrylate, iso-propyl acrylate, n-butyl acrylate, n-butyl acrylate, iso-butyl acrylate, t-butyl acrylate, n-amyl acrylate, iso-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, or a combination of any two or more thereof.

As noted above, Block B of the BRC is a random amphiphilic block that has a random distribution of hydrophobic and ionizable repeat units. While the hydrophobic units may be selected from those described above with regard to Block A, the ionizable repeat units include those with a carboxyl group. Within Block B, there is a target ratio of hydrophobic to ionizable groups. The ratio may be about 0% to about 90% hydrophobic groups and about 10% to about 100% ionizable groups, where the percentages are based upon mol percent. In some embodiments, the ratio may be about 60% to about 80% hydrophobic groups and about 20% to about 40% ionizable groups.

Illustrative ionizable repeat units may be derived from monomers such as, but not limited to, methacrylic acid, acrylic acid, vinyl benzoic acid, vinyl acetic acid, maleic anhydride, maleic acid, maleate, fumarate, crotonic acid, itaconic acid, fumaric acid, citraconic anhydride, mono 2-(methacryloyloxy)ethyl phthalate, mono 2-(methacryloyloxy)ethyl succinate, mono 2-(acryloyloxy)ethyl succinate, or a combination of any two or more thereof.

In some embodiments, the emulsion polymerization system may include a BRC where Block A is a polystyrene, poly-α-methyl styrene, acrylate, methacrylate, or a copolymer of any two or more thereof, and where Block B is a random amphiphilic copolymer of polystyrene, poly-α-methyl styrene, an acrylate, a methacrylate, or a copolymer of any two or more thereof. Illustrative, specific BRCs include, but are not limited to, polystyrene-b-(poly(styrene-r-acrylic acid)), poly-α-methylstyrene-b-(poly(styrene-r-acrylic acid)), poly(butyl acrylate)-b-poly(styrene-r-acrylic acid), poly(butyl acrylate)-b-poly(butyl acrylate-r-acrylic acid), polystyrene-b-poly(butyl acrylate-r-acrylic acid), poly (methyl methacrylate-r-butyl acrylate)-b-poly(butyl acrylate-r-acrylic acid), or poly(styrene-r-butyl acrylate)-b-poly (butyl acrylate-r-acrylic acid).

In the BRC, the ratio of Block A to Block B may vary. For example, the copolymer may include, on a total molar ratio of the copolymer, from 20% to 60% Block A, and from 40% to 80% Block B. This may include from 30% to 50% Block A, and from 50% to 70% Block B. Such percentages are based upon mol percent.

In order to achieve acceptable dispersion and/or dissolution of the BRC in the water of the emulsion polymerization system, at a least a partial neutralization of the ionizable groups in Block B may be conducted. If the ionizable group is an acid, neutralization may be accomplished by addition of a base, including, but not limited to, ammonium hydroxide, alkali metal hydroxides, alkaline earth hydroxides, alkali metal oxides, alkaline earth oxides, ammonia, trialkylamine (i.e. trimethylamine, trimethylamine, triethanolamine, etc.), or a mixture of any two or more thereof. Accordingly, in any of the embodiments described herein, from greater than 5% to about 100% of the ionizable groups may be neutralized. This may include from about 20% to about 100% of the ionizable groups are neutralized.

The polymerization systems are high solids systems. Accordingly, as much of the polymer should be dispersed as possible. In some embodiments, at least 40 wt % of the polymer is dispersed in the system.

In the polymerization system, the BRC may be present from about 0.5 wt % to about 50 wt %, based upon the weight of the emulsion polymer. This may include from about 1 wt. % to about 30 wt. %. Additionally, the polymerization system may contain from about 1 wt % to about 60 wt % solids. This may include from about 1 wt. % to about 50 wt. % solids.

In forming the BRCs, living polymerization is employed. Living polymerizations provide a means of synthesizing complex polymeric structures of predictable molecular mass and low molecular mass distributions. Living polymerization can be achieved through numerous synthetic strategies, including anionic, cationic, ring-opening metathesis, and free radical polymerization, and chain-growth polycondensation. The synthesis of BRCs is not limited to any one type of living polymerization, and will depend on the applicability of the technique to the specific monomers to be polymerized, the desired control of the molecular weight distribution, and the final chain-end functionalities.

Nitroxide-mediated polymerization (NMP) is an example of a commonly employed living radical polymerization technique. NMP provides a thermally activated reversible termination step, where a living radical exists in the active or dormant state. When active, propagation ensues until the radical is capped with the nitroxide, and the process then repeats as propagation ensues. Nitroxide-capped polymer chains may then be purified and used later to initiate the polymerization of different monomers. The result is a polymer chain with "blocks"—regions of the chain with distinct compositions. In cases where Block A is first synthesized, the purification of Block A may not be necessary if the monomers of Block A will also be contained in Block B.

In another aspect, a method of emulsion polymerization is provided. The method includes mixing water and a BRC to form any of the emulsion polymerization systems as described herein, and adding to the polymerization system, with agitation, monomers and initiator(s) at a temperature sufficient to effect polymerization of the monomers. The BRCs used in this method may be any of those as described herein. As also noted above, if neutralization of the BRC is required for compatibilization with the water, a neutralization step may be conducted.

The methods, as with the polymerization systems, remain essentially free of, or only with low amounts of, small molecule surfactants. Additionally, the polymerization systems of the present application do not require water soluble co-monomers to compatibilize otherwise non-soluble monomers with an aqueous solution during the polymerization process. Accordingly, hydrophobic polymerizations may be conducted in water using the BRCs as polymerization stabilizers.

Illustrative monomers that may be polymerized in such methods include, but are not limited to: styrenic monomers, methacrylate monomers, acrylate monomers, (vinyl) acetate monomers, or a mixture of any two or more thereof. Illustrative monomers include, but are not limited to, styrene, α-methyl styrene, methacrylic acid, acrylic acid, vinyl benzoic acid, vinyl acetic acid, maleic anhydride, maleic acid, maleate, fumarate, crotonic acid, itaconic acid, fumaric acid, citraconic anhydride, mono 2-(methacryloyloxy)ethyl phthalate, mono 2-(methacryloyloxy)ethyl succinate, mono 2-(acryloyloxy)ethyl succinate, hydrophobic, ethyl acrylate, n-propyl acrylate, iso-propyl acrylate, n-butyl acrylate, n-butyl acrylate, iso-butyl acrylate, t-butyl acrylate, n-amyl acrylate, iso-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, or a combination of any two or more thereof.

As will be understood, such emulsion polymerizations may be conducted by a wide variety of methods. Such methods may include, but are not limited to, batch, semi-batch, and continuous polymerization.

During the polymerization process, the BRC may be added all at the beginning, fed during the polymerization, or added at discrete intervals.

The present invention, thus generally described, will be understood more readily by reference to the following examples, which are provided by way of illustration and are not intended to be limiting of the present invention.

EXAMPLES

Materials. N-tert-butyl-N-[1-diethylphosphono-(2,2-dimethylpropyl) nitroxide] (85%), N-(tert-butyl)-N-(1-diethylphosphono-2,2-dimethylpropyl)-O-(2-carboxylprop-2-yl) hydroxylamine, styrene (4-tert-butylcatehol as stabilizer, 99%), acrylic acid (anhydrous, 180-200 ppm MEHQ as inhibitor, 99%), ammonium persulfate (>98%) and sodium hydroxide (>98%), dimethyl sulfoxide-D6 (100%, 99.96% D), 1,4-dioxane (99.9%), hydroquinone (crystalline, laboratory grade), tetrahydrofuran (99%), methanol (99.8%), hexanes (98.5%) were used as received. In-house distilled water was further purified (18 MΩ-cm) with a Millipore Synergy purification system running with SynergyPak purification cartridges.

Nitroxide-capped polystyrene macroinitiators (M1, M2) were prepared by the following procedure. Alkoxyamine initiator (18.5 g, 0.049 mol) and styrene (500 g, 4.8 mol) were added to a 1000 mL 3-necked round bottom flask with an attached condenser. This solution was bubbled with nitrogen for 30 minutes with stirring, followed by immersion in a 120° C. bath of silicone oil. The temperature of the solution was monitored with a mercury thermometer inserted into a side neck of the flask; after 15 minutes the temperature reached 110° C. where it remained for either 1.5 hours (M1) or 3 hours (M2) before being cooled in an ice bath. The viscous product was precipitated in methanol. Residual monomer was removed by redissolving the polymer in a minimal amount of THF followed by reprecipitation in methanol and drying under vacuum for one day, as confirmed by the absence of any vinyl peaks in the $^1$H NMR spectrum of the purified macroinitiator. The dried polymer was easily crushed into a white powder (M1, $M_n$=3300 g/mol, Đ=1.13; M2, $M_n$=5600 g/mol, Đ=1.10; from GPC analysis).

Example 1

Chain Extensions with Styrene and Acrylic Acid. A variety of block (BC) and block-random copolymers (BRC) were synthesized with varying stabilizing block compositions, and the formulations are presented in Table 1. In general, macroinitiator, styrene, 1,4-dioxane and N-tert-butyl-N-[1-diethylphosphono-(2,2-dimethylpropyl) nitroxide] ("N-BDDN"; 10% excess based on macroinitiator) were mixed in a 20-mL glass vial. After homogenizing, acrylic acid was added and the reaction mixture was degassed under nitrogen for 30 minutes. Subsequently, the vial was tightly sealed with a plastic cap and placed in a silicone oil bath at 115-125° C. with stirring. After the desired reaction time, the polymer was precipitated in hexanes. After decanting the hexanes, two more washings were conducted with hexanes to remove residual monomer. The polymer was then dried overnight under vacuum at 40° C. Purification was determined by the absence of vinyl peaks in the $^1$H NMR spectra.

TABLE 1

Formulations for block and block-random copolymers.

| Block Copolymer | M2 (mol/L) | N-BDDN (mol/L) | Styrene (mol/L) | Acrylic Acid (mol/L) | Dioxane (mol/L) | Reaction Time (hours) | Reaction Temp (° C.) |
|---|---|---|---|---|---|---|---|
| B1 | 0.031 | 0.0031 | 0 | 2.8 | 8.3 | 2 | 115 |
| B2 | 0.019 (M1) | 0.0019 | 0 | 2.9 | 8.6 | 1 | 115 |
| B3 | 0.019 (M1) | 0.0019 | 0 | 2.9 | 8.6 | 2 | 115 |
| B4 | 0.019 (M1) | 0.0019 | 0 | 2.9 | 8.6 | 3 | 115 |
| BR1 | 0.030 | 0.003 | 3.2 | 1.3 | 4.4 | 1.5 | 125 |
| BR2 | 0.030 | 0.003 | 3.2 | 1.3 | 4.5 | 0.5 | 125 |
| BR3 | 0.030 | 0.003 | 3.3 | 1.1 | 4.4 | 1.5 | 125 |
| BR4 | 0.046 (M1) | 0.005 | 3.2 | 1.4 | 4.6 | 1.5 | 125 |
| BR5 | 0.030 | 0.003 | 3.0 | 1.5 | 4.5 | 1.5 | 125 |
| BR6 | 0.030 | 0.008 | 2.5 | 1.7 | 5.1 | 1.5 | 125 |
| BR7 | 0.017 | 0.002 | 1.3 | 1.3 | 7.8 | 1.5 | 125 |
| BR8 | 0.018 | 0.002 | 1.1 | 1.6 | 7.9 | 8.0 | 120 |
| BR9 | 0.030 | 0.003 | 3.1 | 1.3 | 4.5 | 1.5 | 125 |
| BR10 | 0.030 | 0.003 | 3.0 | 1.4 | 4.5 | 1.5 | 125 |
| BR11 | 0.029 | 0.003 | 3.9 | 0.4 | 4.3 | 1.5 | 125 |
| BR12 | 0.029 | 0.003 | 3.5 | 0.9 | 4.4 | 1.5 | 125 |
| BR13 | 0.029 | 0.003 | 3.7 | 0.6 | 4.3 | 1.5 | 125 |
| BR14 | 0.018 | 0.002 | 0.8 | 1.9 | 8.0 | 1.5 | 125 |
| BR15 | 0.013 | 0.001 | 1.8 | 0.8 | 7.8 | 4.0 | 125 |

Example 2

Block and Block-Random Copolymer Stock Dispersions. Upon isolating the stabilizers, a stock dispersion was prepared at 0.7 g/L (block copolymers) or 50 g/L (block-random copolymers). Each block ("B #" in Table 1) and block-random copolymer ("BR #" in Table 1) was added to a 20 mL glass flask with a stoichiometric amount of 1 M sodium hydroxide relative to acrylic acid, and a balance of water to bring the final volume to 15 mL. The mixture was then stirred and heated in a silicone oil bath at 90° C. up to 24 hours, or until dispersed. The resulting transparent dispersions were filtered (0.2 μm) before being analyzed and used in emulsion polymerizations.

Example 3

Styrene Emulsion Polymerization. A batch emulsion polymerization of styrene was used as a standard test procedure wherein either a block or block-random copolymer was used as the stabilizer. The general procedure began by adding styrene monomer (1 g), deionized water, sodium hydroxide (0.1 g of 1 M solution), and ammonium persulfate (0.1 g of 30 g/L solution) to an aqueous copolymer dispersion, such that the mixture was 50% styrene by weight. This mixture was then sealed in a 5 mL round bottom flask and immersed in an 85° C. bath of silicone oil with stirring. Emulsion polymerizations were closely monitored and allowed to continue for 4 hours unless significant coagulum was noticed in which case the polymerization was stopped earlier.

Example 4

Characterization. Gel-permeation chromatograph. The BCs and BRCs were added to chromatography vials at 20 mg in 1.5 mL of THF. The carboxylic acid groups were methylated to avoid chemical or physical interaction with the columns. A drop of methanol and (trimethylsilyl)diazomethane were added to methylate the carboxylic acid groups of the acrylic acid units. The polymers being analyzed were thus, polystyrene-b-(polystyrene-r-poly(methyl acrylate)). The calibration used for analysis used polystyrene standards. Therefore, all molecular weights reported are a polystyrene equivalent. Tables 2 and 3 present the characterization/testing results for select copolymers.

Nuclear Magnetic Resonance. $^1$H NMR spectroscopy was conducted on an FT-NMR Bruker Avance 400 MHz spectrometer at room temperature. A total of 60 scans produced each spectra of the block copolymers at 5 mg/mL in DMSO-$d_6$. To determine the composition, the carboxylic acid peaks (11-12 ppm) expressed by the poly(acrylic acid) and the aromatic peaks (6.5-8.0 ppm) were integrated.

Dynamic Light Scattering. Hydrodynamic particle size was evaluated through dynamic light scattering (DLS) using a Malvern Zetasizer Nano ZS at 25° C. with non-invasive backscatter optics (173°), using a 4 mW He—Ne (633 nm) laser. Stock solutions at 50 g/L were added directly to a quartz cuvette for measurement. Latex samples were diluted as one drop to 1 mL of purified water in a quartz cuvette. The Malvern Dispersion Technology Software (version 7.11) was used to process all data. Reported sizes are an average of 35-40 measurements per sample.

Thermal Gravimetric Analysis. Gravimetric analysis required comparing the weight of wet and dry samples. This was conducted by mixing 500 μl, of the latex and 100 μL of a 0.1 M solution of hydroquinone and drying under vacuum at 40° C. overnight. Hydroquinone acts as an inhibitor to further polymerization while the sample is heated. Coupling the hydrodynamic radius measured through DLS with the solids content from thermal gravimetric analysis gives the number of particles in a latex.

$$N_p = \frac{6\tau}{\pi \rho D_n^3} \quad \text{(Eq. 1)}$$

Where $\tau$ is the solids content of the latex (g/L), $\rho$ is the density of polystyrene (1.05 g cm$^{-3}$) and $D_n$ is the hydrodynamic radius of the latex particles (cm).

In establishing a compositional operating range, the mole percentage of acrylic acid units in the stabilizing block ($f_{AA}$) and overall ($F_{AA}$) were considered.

Example 5

Aqueous Dispersions. After characterization, stock dispersions of each BRC were prepared at 50 g/L. Block-random copolymers with an $f_{AA}$ between 21 and 52%, and an $F_{AA}$ between 14 and 26% could be dispersed in water. Block-random copolymers BR8-13 were not dispersible in water. Block copolymers B1-4 could be dispersed in water at low (0.7 g/L) concentration.

Rayleigh scattering was observed for the samples since the particle sizes are small relative to the wavelength of light used in measurements. Moreover, the intensity of scattered light is proportional to the particle diameter to the sixth power. This means that small particles will be a relatively insignificant fraction of the intensity average sizes. Similarly, the intensity of scattered light scales directly with volume, therefore, assuming spherical particles, with radius to the third power. So, the volume average size will account for larger particles significantly more than smaller particles. Because of this, the most important measure is the number average diameter which implies most particles are this reported size.

TABLE 2

A summary of all block and block-random copolymers studied. Molecular weights and molecular weight dispersities were determined through GPC and are polystyrene equivalents. NMR and GPC allowed for elucidation of random block composition.

| Copolymer | $M_n$ (g/mol)[a] | Đ[b] | Formula[c] | $F_{AA}$ (% mol/mol)[d] | $f_{AA}$ (% mol/mol)[e] |
|---|---|---|---|---|---|
| B1 | 7500 | 1.12 | PS$_{51}$-b-PAA$_{22}$ | 30% | 100% |
| B2 | 5100 | 1.19 | PS$_{29}$-b-PAA$_{22}$ | 43% | 100% |
| B3 | 8400 | 1.33 | PS$_{29}$-b-PAA$_{61}$ | 68% | 100% |
| B4 | 12100 | 1.57 | PS$_{29}$-b-PAA$_{103}$ | 78% | 100% |
| BR1 | 16,600 | 1.16 | PS$_{51}$-b-(PS$_{86}$-r-PAA$_{23}$) | 14% | 21% |
| BR2 | 9,800 | 1.24 | PS$_{51}$-b-(PS$_{29}$-r-PAA$_{14}$) | 15% | 33% |
| BR3 | 13,900 | 1.2 | PS$_{51}$-b-(PS$_{62}$-r-PAA$_{20}$) | 15% | 24% |
| BR4 | 9,400 | 1.14 | PS$_{51}$-b-(PS$_{48}$-r-PAA$_{16}$) | 17% | 25% |
| BR5 | 15,500 | 1.19 | PS$_{51}$-b-(PS$_{70}$-r-PAA$_{29}$) | 19% | 29% |
| BR6 | 11,400 | 1.18 | PS$_{51}$-b-(PS$_{38}$-r-PAA$_{21}$) | 19% | 36% |
| BR7 | 10,400 | 1.2 | PS$_{51}$-b-(PS$_{24}$-r-PAA$_{26}$) | 26% | 52% |
| BR8 | 17,000 | 1.32 | PS$_{51}$-b-(PS$_{65}$-r-PAA$_{53}$) | 31% | 45% |
| BR9 | 7,000 | 1.60 | PS$_{51}$-b-(PS$_{3}$-r-PAA$_{12}$) | 18% | 80% |
| BR10 | 16,700 | 1.13 | PS$_{51}$-b-(PS$_{99}$-r-PAA$_{9}$) | 6% | 8% |
| BR11 | 16,300 | 1.15 | PS$_{51}$-b-(PS$_{88}$-r-PAA$_{17}$) | 11% | 16% |
| BR12 | 16,000 | 1.14 | PS$_{51}$-b-(PS$_{87}$-r-PAA$_{15}$) | 10% | 15% |
| BR13 | 8,600 | 1.47 | PS$_{51}$-b-(PS$_{1}$-r-PAA$_{33}$) | 97% | 39% |

[a]Polystyrene equivalent number average molecular weight.

[b]Molecular weight dispersity index, defined as: $Đ = \frac{M_w}{M_n}$, where $M_w$ is the weight average molecular weight

[c]PS = polystyrene, PAA = poly(acrylic acid).

[d]Molar fraction of acrylic acid in the entire polymer.

[e]Molar fraction of acrylic acid in the stabilizing block.

TABLE 3

Particle hydrodynamic diameters measured through DLS. All number average peaks were 100% of the measured peaks, which confirms that most particles in the system were these diameters. Inadequate filtering is a possible cause of the large sizes measured on a volume and intensity average.

| Copolymer | Peaks by Number (nm) | Z-Avg (nm)[a] | PDI[b] | Peaks by Volume (nm) |
|---|---|---|---|---|
| BR1 | 5.0 | 20.25 | 0.5 | 42.8 (75%), 7.5 (22.3%), 3706 (2.3%) |
| BR2 | 3.3 | 14.95 | 0.4 | 32.1 (98%), 3884 (2%) |
| BR3 | 3.9 | 21.91 | 0.7 | 204.7 (43%), 24.5 (39%), 6.0 (18%) |
| BR4 | 2.4 | 15.06 | 0.4 | 3.8 (38%), 12.4 (31%), 211.4 (16%) |
| BR5 | 2.8 | 26.76 | 0.7 | 26.4 (55%), 208.3 (34%), 3.8 (3.6%) |
| BR6 | 5.0 | 20.34 | 0.4 | 46.9 (99%), 4119 (1%) |
| BR7 | 9.2 | 45.75 | 0.8 | 783.6 (58%), 22.4 (42%) |

[a] Intensity average hydrodynamic diameter.
[b] Polydispersity index of the particle size, defined as:
$$PDI \equiv \left(\frac{\text{Standard deviation}}{\text{intensity average}}\right)^2.$$

An estimation of particle diameters can be determined assuming pure polystyrene chains are completely collapsed in water (a non-solvent for polystyrene). The assumption of a pure polystyrene approximates BRC chains which contain around 70%-80% styrene. Considering this, the diameter can be estimated (Eq. 2) using the volume of one monomer unit ($v_m = 0.163$ nm$^3$) and the degree of polymerization (DP).

$$D_{PS} = 2\left(\frac{3V}{4\pi}\right)^{\frac{1}{3}} = 2\left(\frac{3v_m DP}{4\pi}\right)^{\frac{1}{3}} = 0.683 DP^{\frac{1}{3}} \quad \text{(Eq. 2)}$$

Diameters of the particles as measured by DLS and those estimated by Eq. 2 (3 to 4 nm) correlate well, suggesting single- or few-chain nanoparticles are forming. Further analysis through AFM agree with the DLS measurements.

Another exciting result of the dispersions is the high concentrations that are achievable. In the literature, single-chain nanoparticles are usually dispersed at less than 1 g/L. BRC dispersions are prepared at 50 g/L, which is substantially higher than 1 g/L. The upper extent of achievable dispersion concentration was briefly investigated using BR5.

High Concentration Dispersions

Dispersions of BR5 were prepared at 100 g/L, 150 g/L, 200 g/L and 300 g/L maintaining stoichiometric equivalence of sodium hydroxide to acrylic acid units. The upper concentration limit for magnetic stirring was found between 200 g/L and 300 g/L.

Styrene Emulsion Polymerizations

TABLE 4

Characterization of styrene emulsions conducted using BR5. The targeted polystyrene solids content was 15% in all cases. Higher solids contents are due to the stabilizer contribution.

| Emulsion | [S] (mM)[a] | wt % BOM[b] | $D_n$ (nm)[c] | PDI[d] | Solids Content (%) | $N_p$ (L$^{-1}$) (×10$^{16}$)[e] | Surface Area (cm$^2$/L) (×10$^7$)[f] |
|---|---|---|---|---|---|---|---|
| BR5-E1 | 0.27 | 3 | 396 | 0.09 | 13 | 0.39 | 1.9 |
| BR5-E2 | 0.54 | 6 | 189 | 0.02 | 14 | 3.7 | 4.2 |
| BR5-E3 | 0.81 | 8 | 162 | 0.02 | 15 | 63 | 5.2 |
| BR5-E4 | 1.07 | 11 | 144 | 0.02 | 17 | 10 | 6.7 |
| BR5-E5 | 1.34 | 14 | 116 | 0.05 | 18 | 20 | 8.6 |
| BR5-E6 | 1.61 | 17 | 86 | 0.03 | 17 | 48 | 11 |
| BR5-E7 | 1.88 | 19 | 81 | 0.02 | 18 | 62 | 13 |
| BR5-E8 | 2.15 | 22 | 81 | 0.04 | 19 | 67 | 14 |

[a] BRC stabilizer concentration.
[b] Weight percentage of BRC stabilizer based on monomer (styrene).
[c] Number average particle size as measured through DLS.
[d] Polydispersity index of the particle size as measured through DLS.
[e] Number of latex particles in the system calculated through Eq. 1.
[f] Total surface area of the latex particles assuming monodisperse spheres.

Figure 2:
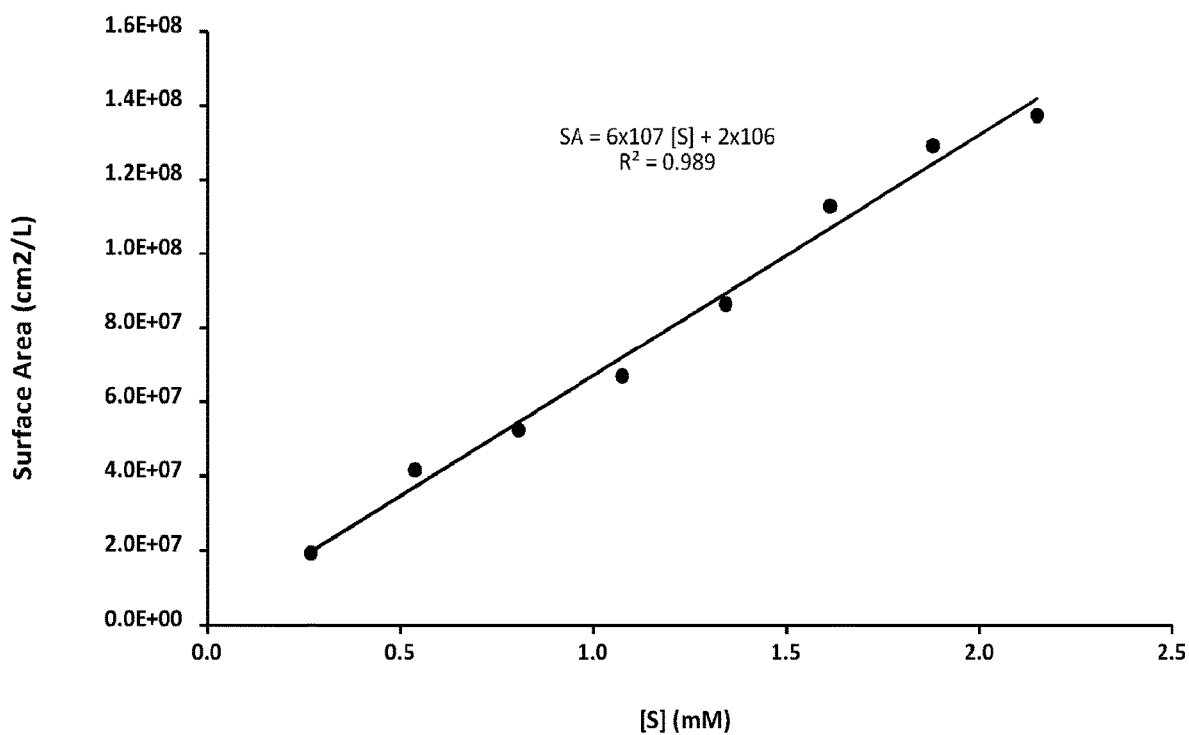
FIG. 2 is a graph of total available surface area of a styrene latex as a function of block-copolymer concentration. Assuming the stabilizer covers all available surface area, the performance of stabilization can be determined through the slope. In the case of BR5, the area of coverage per chain is 11 $nm^2$.

More stabilizer produces a larger number of smaller particles as expected, and this implies a substantial increase in total surface area. These trends are observed for all emulsion polymerizations. The relationship of BRC concentration to total particle surface area was found to be linear (FIG. 2).

A similar treatment of emulsion polymerization results for all other BRCPs provides a means of evaluating the effects of composition and molecular weight of the stabilizing block on BRCP performance. In all cases the total surface area in the system was directly proportional to the concentration of stabilizer added.

TABLE 5

Area of stabilization for all copolymers on a per chain, gram and acrylic acid unit basis.

| Stabilizer | Stabilizing Block Composition | | Stabilization Areas | | |
|---|---|---|---|---|---|
| | [a] $DP_S$ | [b] $DP_{AA}$ | [c] $a_s$ (nm²/chain) | [d] $a_{s,g}$ (nm²/g) (×10²⁰) | [e] $a_{s,AA}$ (nm²/AA) |
| BR1 | 86 | 23 | 11.7 | 4.2 | 0.51 |
| BR2 | 29 | 14 | 6.0 | 3.7 | 0.43 |
| BR3 | 62 | 20 | 8.6 | 3.7 | 0.43 |
| BR4 | 48 | 16 | 6.8 | 4.4 | 0.43 |
| BR5 | 70 | 29 | 10.8 | 4.2 | 0.37 |
| BR6 | 38 | 21 | 8.6 | 4.5 | 0.40 |
| BR7 | 24 | 26 | 5.1 | 3.0 | 0.20 |

[a] Degree of polymerization of styrene in the stabilizing block.
[b] Degree of polymerization of acrylic acid in the stabilizing block.
[c] Surface area of stabilizer coverage on a per chain basis.
[d] Surface area of stabilizer coverage on a mass basis.
[e] Surface area of stabilizer coverage per acrylic acid unit in the stabilizing block (i.e. $DP_{AA}$).

Example 6

To test the concentration limit of the BRCS's, a series was prepared using BR5 from 50 to 300 g/L. It was found that between 200 and 300 g/L was the upper limit of magnetic stirring. The high viscosity of the 300 g/L dispersion caused magnetic stirring to stop.

An interesting observation was made with respect to BR4, which had a shorter anchoring block ($PS_{29}$). That is, dispersion occurred readily within about 10 minutes of heating and stirring at 90° C., whereas those with anchoring blocks at $PS_{52}$ took the entire 6 hours.

Styrene Emulsion Polymerizations

Figure 3:
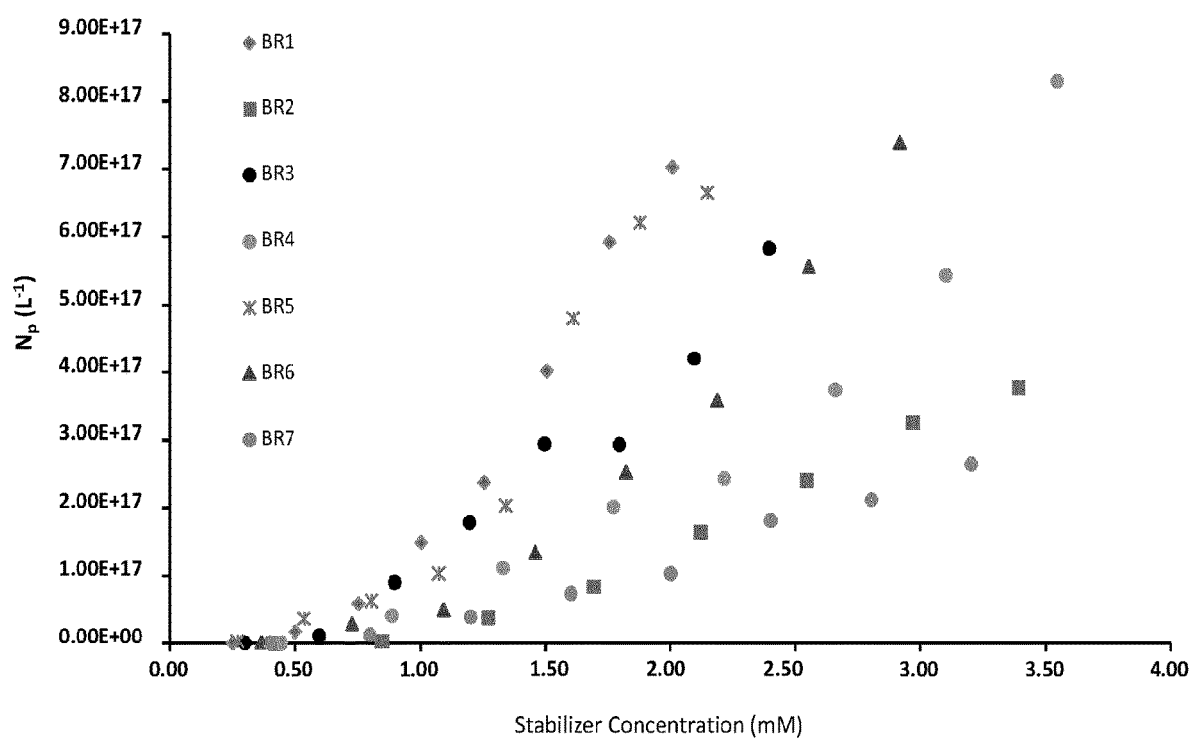
FIG. 3 is a graph of particle number versus block copolymer concentration profiles of all emulsion polymerizations, according to Example 2. Those increasing more rapidly have higher stabilization areas on a per chain basis.

All emulsion polymerizations stabilized by BR1-7 were successful and the results are shown in FIG. 3. All plots of surface area versus stabilizer concentration are linear, with $R^2$ values between 0.993 and 0.953.

Scheme 1

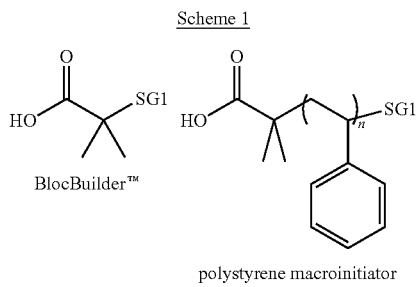

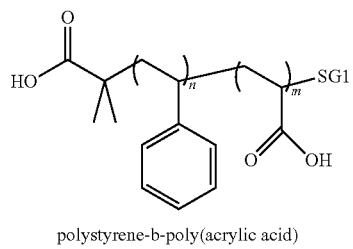

polystyrene-b-poly(acrylic acid)

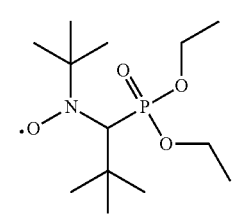

SG1

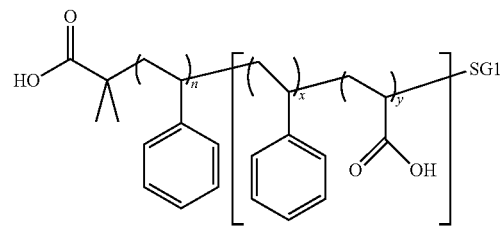

polystyrene-b-[polystyrene-r-poly(acrylic acid)]

Example 7

High Solids Emulsion Polymerization Procedure. A batch emulsion polymerization of styrene was used as a standard test procedure wherein either a block or block-random copolymer was used as the stabilizer. The general procedure began by adding styrene monomer (1 g), deionized water, sodium hydroxide (0.1 g of 1 M solution), and ammonium persulfate (0.1 g of 30 g/L solution) to an aqueous copolymer dispersion, such that the mixture was 50% styrene by weight. This mixture was then sealed in a 5 mL round bottom flask and immersed in an 85° C. bath of silicone oil with stirring. Emulsion polymerizations were closely monitored and allowed to continue for 4 hours unless significant coagulum was noticed in which case the polymerization was stopped earlier.

Dispersions of B1-4, BR1, and BR4 were used to stabilize high solids content emulsion polymerizations of styrene with a target solids content of 50 wt %. The weight fraction of block-random copolymer of 5 wt % based on monomer led to stable emulsion polymerizations at high solids content, while all block copolymers failed to stabilize an emulsion polymerization beyond a solids content of 40 wt %. Block copolymers with a longer hydrophilic block resulted in lower solids content compared to those with shorter hydrophilic blocks. Characteristics of the emulsion polymerizations are reported in Table 6.

TABLE 6

Characterization of emulsion polymerizations stabilized by block and block-random copolymers. Target solids content was 50%.

| Stabilizer | [stabilizer] (mM) | wt % BOM[a] | $D_{h,n}$ (nm)[b] | PDI[c] | Solids Content (%)[d] | $N_p$ (L$^{-1}$) (×10$^{16}$) | IPD (nm) (eq 6.2) |
|---|---|---|---|---|---|---|---|
| B1  | 1.16 | 1.7  | 137 | 0.13 | 36[e] | 25.2 | 31 |
| B2  | 0.04 | 0.04 | 259 | 0.01 | 38[e] | 4.0  | 53 |
| B3  | 0.04 | 0.07 | 144 | 0.06 | 31[e] | 18.6 | 42 |
| B4  | 0.04 | 0.1  | 133 | 0.27 | 24[e] | 18.6 | 53 |
| BR4 | 2.8  | 5    | 214 | 0.06 | 48    | 8.9  | 24 |
| BR1 | 1.6  | 5    | 227 | 0.02 | 50    | 7.7  | 23 |

[a]Weight fraction of a copolymer stabilizer based on monomer
[b]Number-average hydrodynamic diameter calculated by DLS.
[c]Polydispersity Index of particles calculated by DLS.
[d]Weight fraction of solids at end of emulsion polymerization determined gravimetrically.
[e]Maximum achievable weight fraction.

Para. A1. A method of emulsion polymerization, the method comprising: providing water and a water-dispersible block copolymer to form an emulsion polymerization stabilizing system; and adding monomers and initiator(s) to the emulsion polymerization system; wherein: the water-dispersible block copolymer comprises a hydrophobic block ("Block A") and a random amphiphilic block ("Block B") comprising hydrophobic repeat units and ionizable repeat units; and the method uses or comprises less than 1 wt. % of a small molecule surfactant. The small molecule surfactant may be optional.

Para. A2. The method of Para. A1, wherein the monomers are styrenic monomers, methacrylate monomers, acrylate monomers, (vinyl) acetate monomers, or a mixture of any two or more thereof.

Para. A3. The method of Para. A1 or A2, wherein Block A comprises styrenic, acrylate, or methacrylate repeat units.

Para. A4. The method of Para. A1 or A2, wherein Block A comprises a homopolymer based upon styrenic repeat units.

Para. A5. The method of any one of Paras. A1 or A2, wherein Block A is a copolymer block comprising two or more of styrenic, acrylate, or methacrylate repeat units.

Para. A6. The method of any one of Paras. A1-A5, wherein the styrenic repeat units are styrene, α-methyl styrene, or a copolymer thereof.

Para. A7. The method of any one of Paras. A1-A6, wherein the hydrophobic repeat units are styrenic repeat units.

Para. A8. The method of any one of Paras. A1-A7, wherein the hydrophobic repeat units comprise styrene, α-methyl styrene, an acrylate, a methacrylate or a copolymer of any two or more thereof.

Para. A9. The method of any one of Paras. A1-A8, wherein Block B comprises a carboxyl group, a sulfonate group, a phosphate group, an amino group, or a combination of any two or more thereof.

Para. A10. The method of any one of Paras. A1-A8, wherein the ionizable repeat units comprise methacrylic acid, acrylic acid, vinyl benzoic acid, vinyl acetic acid, maleic anhydride, maleic acid, maleate, fumarate, crotonic acid, itaconic acid, fumaric acid, citraconic anhydride, mono 2-(methacryloyloxy)ethyl phthalate, mono 2-(methacryloyloxy)ethyl succinate, mono 2-(acryloyloxy)ethyl succinate, or a combination of any two or more thereof.

Para. A11. The method of any one of Paras. A1-A8, wherein Block B hydrophobic repeat units comprise styrene, α-methyl styrene, ethyl acrylate, n-propyl acrylate, iso-propyl acrylate, n-butyl acrylate, n-butyl acrylate, iso-butyl acrylate, t-butyl acrylate, n-amyl acrylate, iso-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, or a combination of any two or more thereof.

Para. A12. The method of any one of Paras. A1-A11, wherein Block B comprises acrylic acid, and the mole percentage of acrylic acid units in Block B ($f_{AA}$) is from about 21% to about 52%; and overall mole percentage of acrylic acid units in the block copolymer ($F_{AA}$) is from about 14% to about 26%.

Para. A13. The method of any one of Paras. A1-A12, wherein the block copolymer has a number average molecular weight from about 5,000 to about 20,000 g/mol.

Para. A14. The method of any one of Paras. A1-A13, wherein: Block A is polystyrene, poly-α-methyl styrene, an acrylate, a methacrylate, or a copolymer of any two or more thereof; and Block B is a random copolymer of: a first monomer selected from the group consisting of styrene, α-methyl styrene, an acrylate, a methacrylate, or a mixture of any two or more thereof; and a second monomer having an ionizable group selected from the group consisting of a carboxylic acid.

Para. A15. The method of any one of Paras. A1-A13, wherein the water-dispersible block copolymer comprises polystyrene-b-(poly(styrene-r-acrylic acid)), poly-α-methylstyrene-b-(poly(styrene-r-acrylic acid)), poly(butyl acrylate)-b-poly(styrene-r-acrylic acid), poly(butyl acrylate)-b-poly(butyl acrylate-r-acrylic acid), polystyrene-b-poly(butyl acrylate-r-acrylic acid), poly(methyl methacrylate-r-butyl acrylate)-b-poly(butyl acrylate-r-acrylic acid), or poly(styrene-r-butyl acrylate)-b-poly(butyl acrylate-r-acrylic acid).

Para. A16. The method of any one of Paras. A1-A15, wherein the small molecule surfactants have a molecular weight of about 3000 g/mol or less.

Para. A17. The method of any one of Paras. A1-A16, wherein the method uses less than 1 wt. % of a small molecule surfactant.

Para. A18. The method of any one of Paras. A1-A17, wherein the method is free of small molecule surfactants.

Para. A19. The method of any one of Paras. A1-A18, wherein from greater than 5% to about 100% of the ionizable groups are neutralized.

Para. A20. The method of Para. A19, wherein from about 20% to about 100% of the ionizable groups are neutralized.

Para. A21. The method of any one of Paras. A1-A20 comprising from about 1 wt. % to about 30 wt. % of the block copolymer.

Para. A22. The method of any one of Paras. A1-A21, wherein the emulsion polymerization system has a solids content of greater than 40 wt %.

Para. A23. The method of Para. A22, wherein the emulsion polymerization system has a solids content of from 40 wt % to 90 wt %.

Para. A24. A polymer dispersion system comprising: water; and a water-dispersible block copolymer comprising: a hydrophobic block ("Block A"); and a random amphiphilic block ("Block B") comprising a random distribution of hydrophobic repeat units and ionizable repeat units.

Para. A25. The polymer dispersion system of Para. A24, wherein Block A comprises styrenic, acrylate, or methacrylate repeat units.

Para. A26. The polymer dispersion system of any one of Paras. A24-A25, wherein Block A comprises a homopolymer based upon styrenic repeat units.

Para. A27. The polymer dispersion system of any one of Paras. A24-A26, wherein Block A is a copolymer block comprising two or more of styrenic, acrylate, or methacrylate repeat units.

Para. A28. The polymer dispersion system of any one of Paras. A24-A27, wherein the styrenic repeat units are styrene, α-methyl styrene, or a copolymer thereof.

Para. A29. The polymer dispersion system of any one of Paras. A24-A28, wherein the hydrophobic repeat units are styrenic repeat units.

Para. A30. The polymer dispersion system of any one of Paras. A24-A29, wherein the hydrophobic repeat units comprise styrene, α-methyl styrene, an acrylate, a methacrylate, or a copolymer of any two or more thereof.

Para. A31. The polymer dispersion system of any one of Paras. A24-A30, wherein Block B comprises a carboxyl group.

Para. A32. The polymer dispersion system of Para. A31, wherein the ionizable repeat units comprise methacrylic acid, acrylic acid, vinyl benzoic acid, vinyl acetic acid, maleic anhydride, maleic acid, maleate, fumarate, crotonic acid, itaconic acid, fumaric acid, citraconic anhydride, mono 2-(methacryloyloxy)ethyl phthalate, mono 2-(methacryloyloxy)ethyl succinate, mono 2-(acryloyloxy)ethyl succinate, salts thereof, or a combination of any two or more thereof.

Para. A33. The polymer dispersion system of Para. A32, wherein Block B comprises the ester comprising 2-hydroxyethyl acrylate, 2-hydroxyethyl methacrylate, 2,3-hydroxypropyl acrylate, 2,3-hydroxypropyl methacrylate, 2,4-hydroxybutyl acrylate, 2,4-hydroxybutyl methacrylates, methyl acrylate, ethyl acrylate, n-propyl acrylate, iso-propyl acrylate, n-butyl acrylate, n-butyl acrylate, iso-butyl acrylate, t-butyl acrylate, n-amyl acrylate, iso-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, or a combination of any two or more thereof.

Para. A34. The polymer dispersion system of any one of Paras. A24-A33, wherein Block B comprises acrylic acid, and the mole percentage of acrylic acid units in Block B ($f_{AA}$) is from about 21% to about 52%; and overall mole percentage of acrylic acid units in the block copolymer ($F_{AA}$) is from about 14% to about 26%.

Para. A35. The polymer dispersion system of any one of Paras. A24-A34, wherein the block copolymer consists of a single Block A and a single Block B.

Para. A36. The polymer dispersion system of any one of Paras. A24-A35, wherein the block copolymer has a number average molecular weight from about 5,000 to about 20,000 g/mol.

Para. A37. The polymer dispersion system of any one of Paras. A24-36, wherein: Block A is polystyrene, poly-α-methyl styrene, an acrylate, a methacrylate, or a copolymer of any two or more thereof; and Block B is a random copolymer of: a first monomer selected from the group consisting of styrene, α-methyl styrene, an acrylate, a methacrylate, or a mixture of any two or more thereof; and a second monomer having an ionizable group selected from the group consisting of a carboxylic acid.

Para. A38. The polymer dispersion system of any one of Paras. A24-A37, wherein the water-dispersible block copolymer comprises polystyrene-b-(poly(styrene-r-acrylic acid)), poly-α-methylstyrene-b-(poly(styrene-r-acrylic acid)), poly(butyl acrylate)-b-poly(styrene-r-acrylic acid), poly(butyl acrylate)-b-poly(butyl acrylate-r-acrylic acid), polystyrene-b-poly(butyl acrylate-r-acrylic acid), poly(methyl methacrylate-r-butyl acrylate)-b-poly(butyl acrylate-r-acrylic acid), or poly(styrene-r-butyl acrylate)-b-poly(butyl acrylate-r-acrylic acid).

Para. A39. The polymer dispersion system of any one of Paras. A24-A38 which is free of small molecule surfactants.

Para. A40. The polymer dispersion system of Para. A39, wherein the small molecule surfactants have a molecular weight of about 3000 g/mol or less.

Para. A41. The polymer dispersion system of any one of Paras. A24-A40, wherein from greater than 5% to about 100% of the ionizable groups are neutralized.

Para. A42. The polymer dispersion system of Para. A41, wherein from about 20% to about 100% of the ionizable groups are neutralized.

Para. A43. The polymer dispersion system of any one of Paras. A24-A42 comprising from about 1 wt. % to about 60 wt. % of the block copolymer.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

The invention claimed is:

1. A method of conducting emulsion polymerization, the method comprising:
   providing water and a water-dispersible block copolymer to form an emulsion polymerization stabilizing system; and
   adding monomers and at least one initiator to the emulsion polymerization stabilizing system;
   wherein:
   the water-dispersible block copolymer comprises a Block A, which is a hydrophobic block and a Block B, which is a random amphiphilic block comprising hydrophobic repeat units and ionizable repeat units; and
   the method employs less than 1 wt. % of a small molecule surfactant and
   wherein from greater than 5 to about 95% of the ionizable repeating units are neutralized.

2. The method of claim 1, wherein the monomers are styrenic monomers, methacrylate monomers, acrylate monomers, (vinyl) acetate monomers, or a mixture of any two or more thereof.

3. The method of claim 1, wherein the Block A comprises styrenic, acrylate, or methacrylate repeat units.

4. The method of claim 1, wherein the Block A comprises a homopolymer based upon styrenic repeat units.

5. The method of claim 1, wherein the Block A is a copolymer block comprising two or more of styrenic, acrylate, or methacrylate repeat units.

6. The method of claim 4, wherein the styrenic repeat units are styrene, α-methyl styrene, or a copolymer thereof.

7. The method of claim 1, wherein the hydrophobic repeat units are styrenic repeat units.

8. The method of claim 1, wherein the hydrophobic repeat units comprise styrene, α-methyl styrene, an acrylate, a methacrylate or a copolymer of any two or more thereof.

9. The method of claim 1, wherein the Block B comprises a carboxyl group.

10. The method of claim 9, wherein the ionizable repeat units comprise methacrylic acid, acrylic acid, vinyl benzoic acid, vinyl acetic acid, maleic anhydride, maleic acid, maleate, fumarate, crotonic acid, itaconic acid, fumaric acid, citraconic anhydride, mono 2-(methacryloyloxy)ethyl phthalate, mono 2-(methacryloyloxy)ethyl succinate, mono 2-(acryloyloxy)ethyl succinate, or a combination of any two or more thereof.

11. The method of claim 8, wherein the Block B hydrophobic repeat units comprise styrene, α-methyl styrene, ethyl acrylate, n-propyl acrylate, iso-propyl acrylate, n-butyl acrylate, n-butyl acrylate, iso-butyl acrylate, t-butyl acrylate, n-amyl acrylate, iso-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, or a combination of any two or more thereof.

12. The method of claim 1, wherein the Block B comprises acrylic acid;
   a mole percentage of acrylic acid units in the Block B ($f_{AA}$) is from 21% to 52%; and
   an overall mole percentage of acrylic acid units in the water-dispersible block copolymer ($F_{AA}$) is from 14% to 26%.

13. The method of claim 1, wherein the water-dispersible block copolymer has a number average molecular weight from 5,000 to 20,000 g/mol.

14. The method of claim 1, wherein:
   the Block A is polystyrene, poly-α-methyl styrene, an acrylate, a methacrylate, or a copolymer of any two or more thereof; and
   the Block B is a random copolymer of:
   a first monomer selected from the group consisting of styrene, α-methyl styrene, an acrylate, a methacrylate, or a mixture of any two or more thereof; and a second monomer having an ionizable group selected from the group consisting of a carboxylic acid.

15. A method of conducting emulsion polymerization, the method comprising:
providing water and a water-dispersible block copolymer to form an emulsion polymerization stabilizing system; and
adding monomers and at least one initiator to the emulsion polymerization stabilizing system; and
the method employs less than 1 wt. % of a small molecule surfactant and
wherein from greater than 5 to about 95% of the ionizable repeating units are neutralized and
wherein the water-dispersible block copolymer comprises polystyrene-b-(poly(styrene-r-acrylic acid)), poly-α-methylstyrene-b-(poly(styrene-r-acrylic acid)), poly(butyl acrylate)-b-poly(styrene-r-acrylic acid), poly(butyl acrylate)-b-poly(butyl acrylate-r-acrylic acid), polystyrene-b-poly(butyl acrylate-r-acrylic acid), poly(methyl methacrylate-r-butyl acrylate)-b-poly(butyl acrylate-r-acrylic acid), or poly(styrene-r-butyl acrylate)-b-poly(butyl acrylate-r-acrylic acid).

16. The method of claim 1, wherein the method employs less than 0.5 wt. % of a small molecule surfactant.

17. The method of claim 1, wherein the method is free of small molecule surfactants.

18. The method of claim 1, wherein from 20% to 95% of the ionizable groups are neutralized.

19. The method of claim 1, wherein the water-dispersible block copolymer is provided in an amount of from 1 wt. % to 30 wt. %.

20. The method of claim 1, wherein the emulsion polymerization stabilizing system has a solids content of greater than 40 wt %.

21. The method of claim 20, wherein the emulsion polymerization stabilizing system has a solids content of from 40 wt % to 90 wt %.

22. A polymer dispersion system comprising:
water; and
a water-dispersible block copolymer comprising:
a Block A, which is a hydrophobic block is a copolymer block comprising two or more of styrenic, acrylate, or methacrylate repeat units; and
a Block B, which is a random amphiphilic block comprising a random distribution of hydrophobic repeat units and ionizable repeat units comprising acrylic acid, wherein a mole percentage of acrylic acid units in Block B ($f_{AA}$) is from 21% to 52%, and the overall mole percentage of acrylic acid units in the water-dispersible block copolymer ($F_{AA}$) is from 14% to 26%; and
wherein from greater than 5 to about 95% of the ionizable repeating units are neutralized.

23. The polymer dispersion system of claim 22, wherein the Block A comprises styrenic, acrylate, or methacrylate repeat units.

24. The polymer dispersion system of claim 22, wherein the styrenic repeat units are styrene, α-methyl styrene, or a copolymer thereof.

25. The polymer dispersion system of claim 22, wherein the hydrophobic repeat units are styrenic repeat units.

26. The polymer dispersion system of claim 22, wherein the hydrophobic repeat units comprise styrene, α-methyl styrene, an acrylate, a methacrylate, or a copolymer of any two or more thereof.

27. The polymer dispersion system of claim 22, wherein the Block B comprises a carboxyl group.

28. The polymer dispersion system of claim 22, wherein the ionizable repeat units comprise methacrylic acid, acrylic acid, vinyl benzoic acid, vinyl acetic acid, maleic anhydride, maleic acid, maleate, fumarate, crotonic acid, itaconic acid, fumaric acid, citraconic anhydride, mono 2-(methacryloyloxy)ethyl phthalate, mono 2-(methacryloyloxy)ethyl succinate, mono 2-(acryloyloxy)ethyl succinate, salts thereof, or a combination of any two or more thereof.

29. The polymer dispersion system of claim 28, wherein the Block B comprises an ester comprising 2-hydroxyethyl acrylate, 2-hydroxyethyl methacrylate, 2,3-hydroxypropyl acrylate, 2,3-hydroxypropyl methacrylate, 2,4-hydroxybutyl acrylate, 2,4-hydroxybutyl methacrylates, methyl acrylate, ethyl acrylate, n-propyl acrylate, iso-propyl acrylate, n-butyl acrylate, n-butyl acrylate, iso-butyl acrylate, t-butyl acrylate, n-amyl acrylate, iso-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, or a combination of any two or more thereof.

30. The polymer dispersion system of claim 22, wherein the water-dispersible block copolymer consists of a single Block A and a single Block B.

31. The polymer dispersion system of claim 22, wherein the water-dispersible block copolymer has a number average molecular weight from 5,000 to 20,000 g/mol.

32. The polymer dispersion system of claim 22, wherein:
the Block B is a random copolymer of:
a first monomer selected from the group consisting of styrene, α-methyl styrene, an acrylate, a methacrylate, or a mixture of any two or more thereof; and
a second monomer having an ionizable group selected from the group consisting of a carboxylic acid.

33. The polymer dispersion system of claim 22, which is free of small molecule surfactants.

34. The polymer dispersion system of claim 22, wherein from 20% to 95% of the ionizable groups are neutralized.

35. The polymer dispersion system of claim 22, comprising:
from 1 wt. % to 60 wt. % of the water-dispersible block copolymer.

* * * * *